US012411859B2

(12) United States Patent
Kannery et al.

(10) Patent No.: US 12,411,859 B2
(45) Date of Patent: Sep. 9, 2025

(54) SYSTEM AND METHODS TO TUNE TELEMETRY COLLECTION USING BRIGHTNESS OF DATA

(71) Applicant: Dell Products L.P., Round Rock, TX (US)

(72) Inventors: Supriya Kannery, Bangalore (IN); Kalyan C. Gunda, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/647,781

(22) Filed: Jan. 12, 2022

(65) Prior Publication Data

US 2023/0222133 A1 Jul. 13, 2023

(51) Int. Cl.
*G06F 16/2458* (2019.01)
*H04L 43/024* (2022.01)

(52) U.S. Cl.
CPC ........ *G06F 16/2477* (2019.01); *H04L 43/024* (2013.01)

(58) Field of Classification Search
CPC ............. G06F 16/2477; G06F 11/3089; H04L 67/5651; H04L 43/024
See application file for complete search history.

(56) References Cited

U.S. PATENT DOCUMENTS

| | | | |
|---|---|---|---|
| 6,856,257 B1* | 2/2005 | Van Heteren | H04Q 9/00 340/870.11 |
| 9,215,151 B1* | 12/2015 | De Rosa | H04L 43/024 |
| 11,516,308 B1* | 11/2022 | Dubynskiy | G06F 11/3457 |
| 2008/0252481 A1* | 10/2008 | Vacar | H04Q 9/00 340/870.38 |
| 2016/0204992 A1* | 7/2016 | Wu | G06F 11/3006 709/224 |
| 2017/0052831 A1* | 2/2017 | Wu | G06F 11/3476 |
| 2017/0277615 A1* | 9/2017 | Hitchcock | G06F 11/3065 |
| 2018/0176663 A1* | 6/2018 | Damaggio | H04L 41/0816 |
| 2020/0036603 A1* | 1/2020 | Nieves | H04L 47/823 |
| 2020/0052957 A1* | 2/2020 | Tubillara | H04L 67/10 |
| 2020/0167205 A1* | 5/2020 | Guim Bernat | H04L 47/83 |
| 2021/0176142 A1* | 6/2021 | Clarke | H04L 41/5048 |
| 2021/0191726 A1* | 6/2021 | Tarango | G06F 11/3476 |
| 2022/0391712 A1* | 12/2022 | Karri | G16Y 10/75 |

* cited by examiner

*Primary Examiner* — William P Bartlett
(74) *Attorney, Agent, or Firm* — Workman Nydegger

(57) ABSTRACT

One example method includes receiving, by a telemetry collection manager from a telemetry consumer, brightness information concerning data accessed by the telemetry consumer, using, by the telemetry collection manager, the brightness information to determine a collection frequency for telemetry concerning the data, and transmitting, by the telemetry collection manager, telemetry collection frequency information to a telemetry generator. In this way, the telemetry consumer is able to control an amount and timing of telemetry generated by the telemetry generator.

16 Claims, 5 Drawing Sheets

| FREQUENCY IN WHICH DATA IS PULLED FROM TABLE | BRIGHTNESS VALUE |
|---|---|
| INSTANTANEOUS/ AT LEAST ONCE EVERY MINUTE | 10 |
| AT LEAST ONCE EVERY 5 MINUTES | 9 |
| AT LEAST ONCE EVERY 1 HOUR | 8 |
| AT LEAST ONCE EVERY DAY | 7 |
| AT LEAST ONCE EVERY WEEK | 3 |
| AT LEAST ONCE EVERY MONTH | 2 |
| AT LEAST ONCE EVERY YEAR | 1 |
| NOT REQUESTED WITHIN AN YEAR | 0 |

FIG. 3

| DATA OBJECT | BRIGHTNESS FEEDBACK RECEIVED | | | | MAX OF BRIGHTNESS |
|---|---|---|---|---|---|
| | CONSUMER 1 | CONSUMER 3 | CONSUMER 4 | | |
| system_node_id | 9 | 2 | 1 | | 9 |
| system_state | 8 | 7 | 2 | | 8 |
| system_locale | 1 | 1 | 2 | | 2 |

FIG. 4

SYSTEM AND METHODS TO TUNE TELEMETRY COLLECTION USING BRIGHTNESS OF DATA

FIELD OF THE INVENTION

Embodiments of the present invention generally relate to telemetry collection and consumption. More particularly, at least some embodiments of the invention relate to systems, hardware, software, computer-readable media, and methods, for enabling a telemetry consumer to use data brightness as a mechanism to tune aspects of a telemetry stream that the telemetry consumer receives from one or more telemetry generators.

BACKGROUND

At present, there is no defined feedback mechanism in a telemetry system between telemetry consumers and telemetry generators. Particularly, telemetry generators generate data with the assumption that all data set, generated, collected and shared is used by the telemetry consumers, which is not always the case. As a result, telemetry systems get unnecessarily loaded and their performance may be negatively impacted. Further, telemetry consumers may get too much, or not enough, telemetry data. As well, telemetry consumers may not receive telemetry when needed, and may receive telemetry when not needed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 discloses a table that maps object access frequency to a brightness level.

FIG. 4 discloses a table that includes object brightness levels, and an assigned maximum brightness level for various objects.

DETAILED DESCRIPTION OF SOME EXAMPLE EMBODIMENTS

Figure 1:
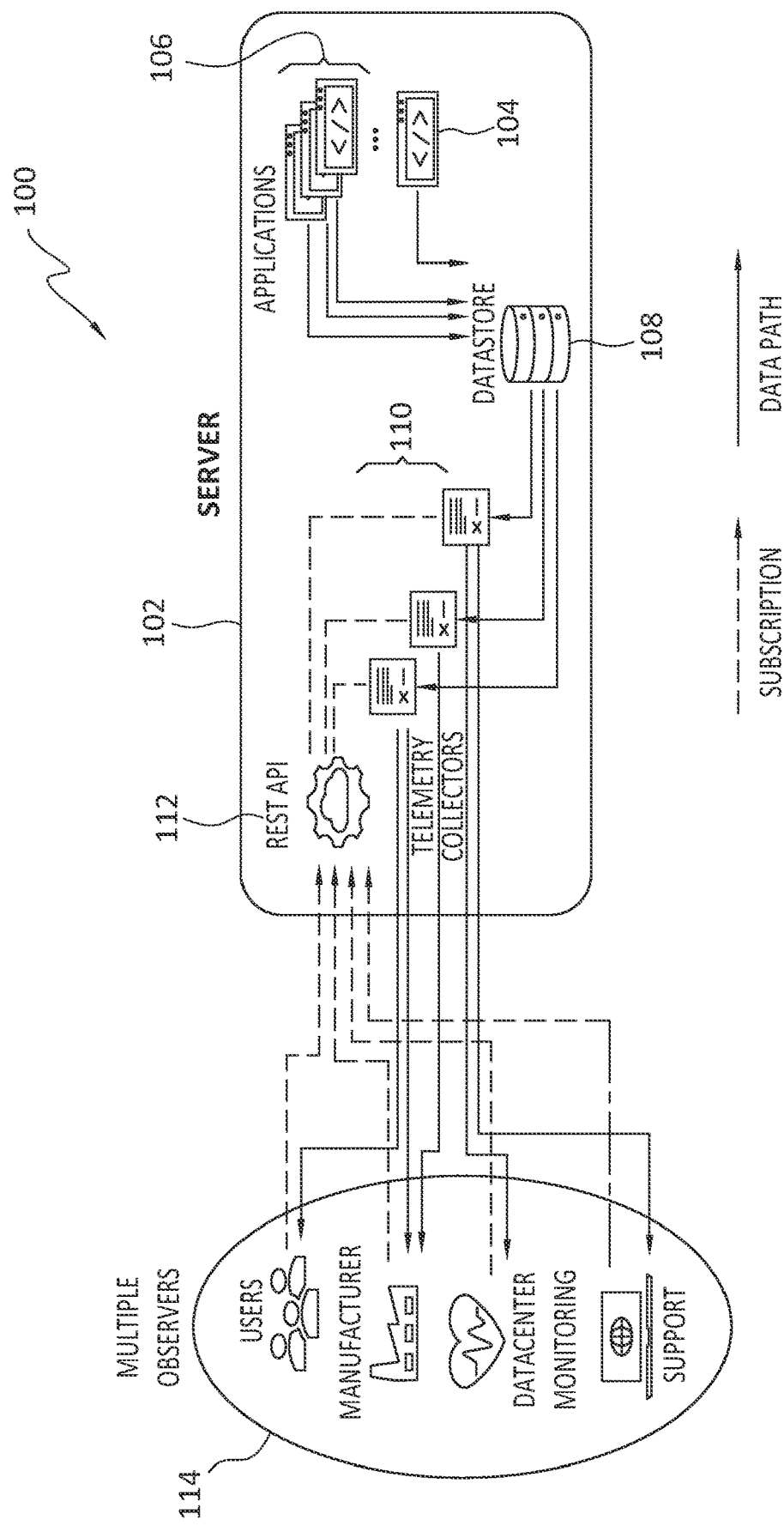
FIG. 1 discloses aspects of an example operating environment for some embodiments of the invention.

Embodiments of the present invention generally relate to telemetry collection and consumption. More particularly, at least some embodiments of the invention relate to systems, hardware, software, computer-readable media, and methods, for enabling a telemetry consumer to use data brightness as a mechanism to tune aspects of a telemetry stream that the telemetry consumer receives from one or more telemetry generators.

In general, example embodiments of the invention may be directed to an architecture that includes a telemetry collections manager that is able to interact with telemetry generators and telemetry consumers. In operation, a telemetry consumer may transmit data brightness information back to a telemetry collections manager, and the telemetry collections manager may use the brightness information received from the telemetry consumers to control a frequency of telemetry collections by one or more telemetry collectors. The brightness information may indicate, for example, a frequency with which the telemetry data is accessed by the telemetry consumer, so that telemetry data that is relatively bright should be collected more often than telemetry data that is not as bright.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a telemetry consumer can control when and how telemetry data is provided to that telemetry consumer. Another aspect of some example embodiments is that a telemetry consumer can provide feedback to telemetry generators, by way of a telemetry collection platform, concerning telemetry collection. An embodiment may help to reduce, or eliminate, the unnecessary collection and processing of telemetry data. Various other advantageous aspects of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

With particular attention to FIG. 1, one example of an operating environment for embodiments of the invention is denoted generally at 100. In general, the operating environment 100 may include one or more servers 102 that may comprise hardware 104 and/or software 106, such as applications for example. The hardware 104 and software 106 may operate to generate telemetry data, or simply 'telemetry,' and store the telemetry data in a datastore 108 of the server. As such, the hardware 104 and software 106 may be referred to herein as 'telemetry generators.' The telemetry data in the datastore 108 may be accessible by one or more telemetry collectors 110 that are able to communicate with external entities by way of an interface 112, such a RESTful (Representational State Transfer) API (Application Program Interface) for example.

With continued reference to the example of FIG. 1, the operating environment 100 may also include one or more observers 114, also referred to herein as 'telemetry consumers.' In general, a telemetry consumer 114 may be any entity with an interest in telemetry data generated by the hardware 104 and/or software 106. As such, example telemetry consumers 114 may include, but are not limited to, users, manufacturers, datacenter monitoring operations, and IT support personnel, among others.

As further indicated in FIG. 1, and in view of the foregoing discussion, the telemetry consumers 114 may be considered as being in a subscriber relationship with the telemetry collectors 110. As well, telemetry data generated by the telemetry generators may be considered as passing along data transmission paths, first, to the datastore 108, next, from the datastore 108 to the telemetry collectors 110 and, finally, from the telemetry collectors 110 to the telemetry consumers 114.

Figure 2:
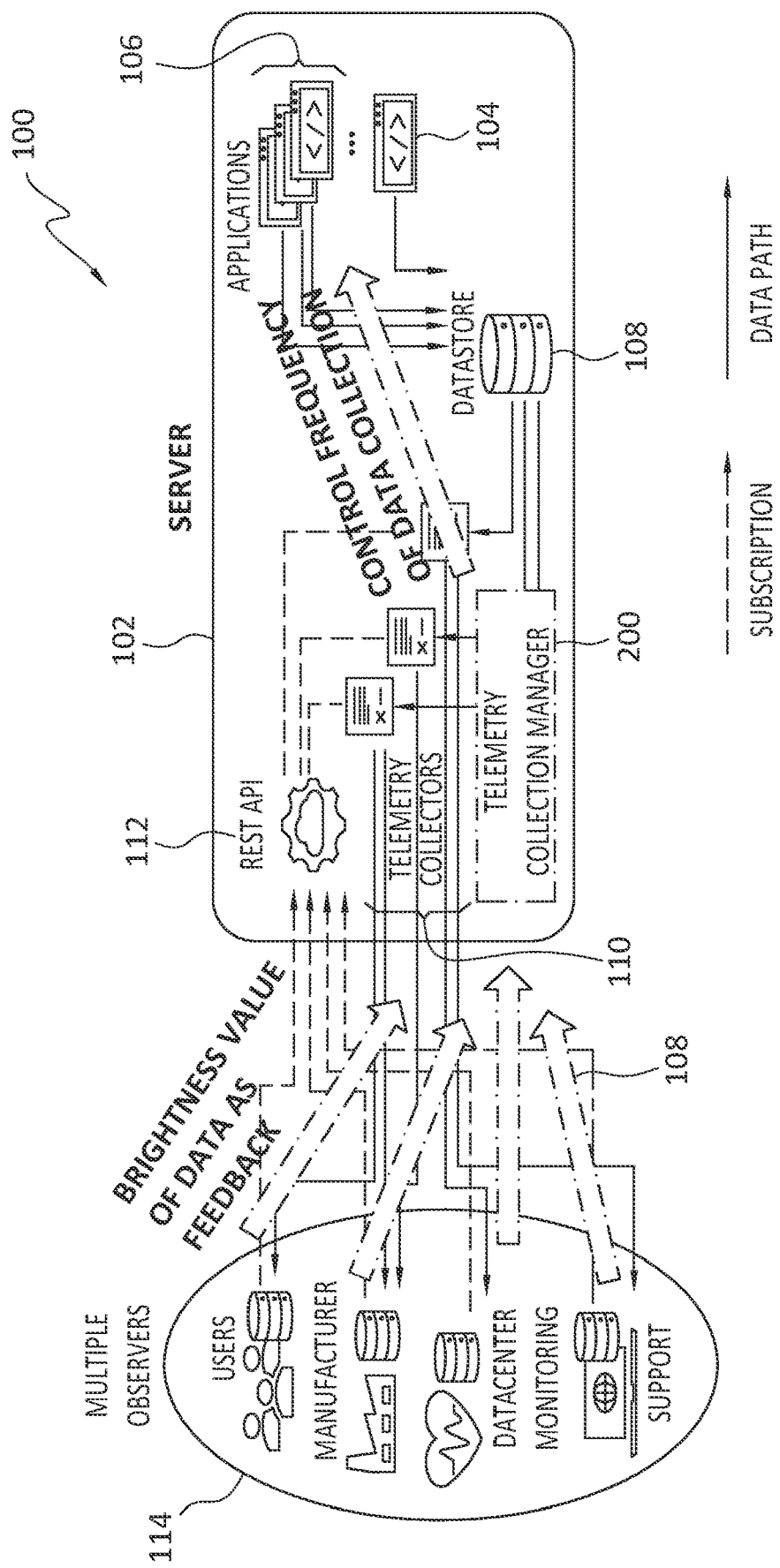
FIG. 2 discloses aspects of the operating environment of FIG. 1, as well as various components according to some embodiments of the invention.

Directing attention now to FIG. 2, example embodiments may employ at telemetry collection manager (TCM) 200 within the example operating environment 100. The TCM 200 may, or may not, be an element of the server 102. In some instances, the TCM 200 may be a stand-alone entity. In terms of its operation, the TCM 200 may be autonomous in the sense that it may not require human input or human intervention to perform its functions. The TCM 200 may have access to the datastore 108, and may also communicate with the telemetry generators, that is, the hardware 104 and applications 106, and with the telemetry collectors 110.

In general, and as discussed in more detail below, the TCM 200 may receive input, or tuning information 202, from the telemetry consumers 114. The tuning information 202 may be used by the TCM 200 to control, for example, the frequency with which telemetry information is collected and stored by the telemetry generators, that is, the hardware 104 and applications 106. In this way, the telemetry consumers 114 are afforded a measure of control over the timing, amount, and content, of the telemetry that they receive. That is, example embodiments may define and implement a feedback mechanism between telemetry consumers 114 and telemetry generators, that is, the hardware 104 and applications 106, which can be used to tune telemetry provided to the telemetry consumers, thereby positively impacting system performance. To this end, the tuning information 202 may comprise information, data, or metadata, about the 'brightness' of the telemetry data employed by the telemetry consumers 114. The relative 'brightness' of telemetry data may be derived from data usage information that may be captured at different data store points and used as feedback to optimize telemetry collection and processing.'

B. Detailed Aspects of Some Example Embodiments

It is noted that as used herein, 'telemetry information' is broad in scope. In general, telemetry information may comprise any information relating to the configuration and/or operation of any telemetry generator. Thus, examples of telemetry information include, but are not limited to, IO (Input/Output operation) load, memory usage, storage usage, CPU power utilization, application and/or hardware uptime and downtime, user information, application errors and exceptions, database accesses, latency, web log information, and database errors and warnings.

With continued reference now to the example of FIG. 2, at every data store, such as the datastore 108 for example, in the telemetry workflow, details of data usage may be captured at a column granularity. According to data usage, a brightness value of a data object is determined, and the brightness information then fed back, either directly, or indirectly by way of the TCM 200, to the telemetry generator, such as an application 106 and/or hardware 104. Thus, for example, an object that is frequently accessed by a telemetry consumer 114 may have a relatively higher brightness value than an object that is less frequently accessed the by the telemetry consumer 114. Because the telemetry consumer 114 is an entity that accesses the object, the telemetry consumer 114 is well positioned to evaluate the brightness of that object, and to send brightness information, as feedback, to the telemetry collection manager 200. Based on the brightness value received for a data object, the telemetry generator can adjust telemetry collection frequency for that data object. Note that telemetry generation need not necessarily be captured at the object level, but could be captured at other levels as well, such as a file level, or application level, for example.

B.1 Data Brightness Mapping

With reference now to FIG. 3, an example table 300 is disclosed that includes a frequency with which particular data, such as one or more objects for example, are pulled from a table, or other data storage structure, of a datastore, such as the datastore 108. As can be seen in the example table 300, the brightness of the data is a function of the frequency with which that data is accessed, where frequently accessed data has a higher brightness value than less frequently accessed data. This is one example of an approach for mapping data access frequency to the brightness of that data.

In more detail, at a datastore 108 in a telemetry consumer system, embodiments may capture the frequency with which data is pulled out from major tables at a column granularity. This can be done, for example, by analyzing the time and parameters used in database queries, as shown in the following sample posgres log that captures timestamp and columns used in an SQL query:

```
2021-07-11 08:22:44.000 GMT PostgreSQLJDBC Driver
  (5827) LOG:
SELECT system_state, system_status, mtree_quota_en-
  abled
  FROM cfg_system_nodes
  WHERE system_id_input=system_id;
```

As noted above, the frequency that the data is pulled can then be mapped to a brightness value for the data, as shown in the table 300. The table 300 may reside at the datastore 108, and may be accessible by the TCM 200. The brightness information, in turn, may be used to control the frequency with which telemetry information is gathered concerning that data.

B.2 Data Brightness Feedback from Telemetry Consumer

With continued reference to FIGS. 2 and 3, and directing attention now to FIG. 4 as well, a telemetry consumer 114 may share, with a telemetry generator such as the hardware 104 and/or applications 106, a brightness value for every data object, using the same structured telemetry data that was sent from the telemetry generator to the telemetry consumer 114. That is, the telemetry consumer 114 may enhance every data object representation, for objects accessed by the telemetry consumer 114, with an additional 'brightness' field. For example, assume that a telemetry generator sends the following data to a telemetry consumer:

{system_nodes:{system_node_id:1, system_state: "HEALTHY", mtree_quota_enabled:"YES", system_locale:"en_US.UTF-8" } }.

Then, once a day, the telemetry consumer 114 may respond back to the telemetry generator and/or the TCM 200 with the following feedback:

{system_nodes:{{system_node_id:1, brightness:9, {system_state: "HEALTHY", brightness:8}, {mtree_quota_enabled:"YES", brightness:2}, {system_locale:"en_US.UTF-8", brightness:1 }}.

Then, the TCM 200 may collect brightness per dataset received from different telemetry consumers 114, and may determine a maximum brightness value. This is indicated in FIG. 4. Particularly, FIG. 4 discloses a table 400 which may be maintained by the TCM 200 at the TCM 200 and/or at the datastore 108. As shown in the table 400, various data objects may be listed, each having a respective brightness value identified by a different telemetry consumer 114. That is, different telemetry consumers 114 may access different objects at different frequencies. For example, the object system_node_id has a brightness of 9 assigned by 'Consumer 1' but 'Consumer 4' has assigned that same object a brightness of only 1, and 'Consumer 3' has assigned the object a brightness of 2. That is, the object is accessed much more frequently by 'Consumer 1' than by 'Consumer 4' or 'Consumer 3.'

Because 'Consumer 1' accesses the object most frequently, the brightness assigned by 'Consumer 1' controls the frequency of telemetry data collection by the telemetry generators concerning that object, even though the other telemetry consumers do not need telemetry data collection at that same frequency. Thus, the brightness of 9 is deemed as the maximum brightness.

The TCM 200 may control the frequency with which a data object is written into the source datastore by respective applications 106. If the maximum brightness value across all telemetry consumers is less, the frequency of data collection can be reduced accordingly. From the example cited earlier, the TCM 200 can notify applications logging system_locale data to reduce its frequency of telemetry collection to once every week as the consumers are using this data only once in a month. When a telemetry generator decides to reduce the frequency of writing system_locale information from every hour to once in a week, instead of 168 writes, there will be one write per week. As discussed below, other cases are possible as well.

For example, in cases where the TCM 200 is receiving 0 brightness value as a maximum brightness value across all consumers, that means that the data object has thus far not been used by any consumers. Thus, the TCM 200 may set the frequency of collection of telemetry data about that data object to one of the lowest frequencies, such as store a rolled up value once in a year.

As another example, it may be possible that the brightness of data is 3, and based on that, the telemetry generators would have a reduced frequency of collection. In case, for example, data pull increases and the brightness value changes to 7 based on telemetry consumer feedback, telemetry generators can re-adapt to increase the frequency of telemetry collection concerning the object. In some embodiments, the action may be left to the telemetry generators, per their requirements, which could be no action, that is, no telemetry collection, in some cases for some data.

C. Further Discussion

As indicated in this disclosure, example embodiments may possess a variety of useful features and advantages. For example, embodiments may enable telemetry consumers to provide feedback to telemetry generators to adjust telemetry collection and sharing. As another example, embodiments may help to avoid unnecessary telemetry data collection and processing. Embodiments may be implemented across a variety of different types of telemetry workflows. Finally, embodiments are not limited to generating and obtaining brightness values solely based on data object usage, but brightness values may additionally, or alternatively, be derived from, or based upon, other attributes of a data object, such as the number of users of the data object, owner of the data object, the type of the data object, criticality of the data object, or the value of the data object to a community of users.

D. Example Methods

Figure 5:
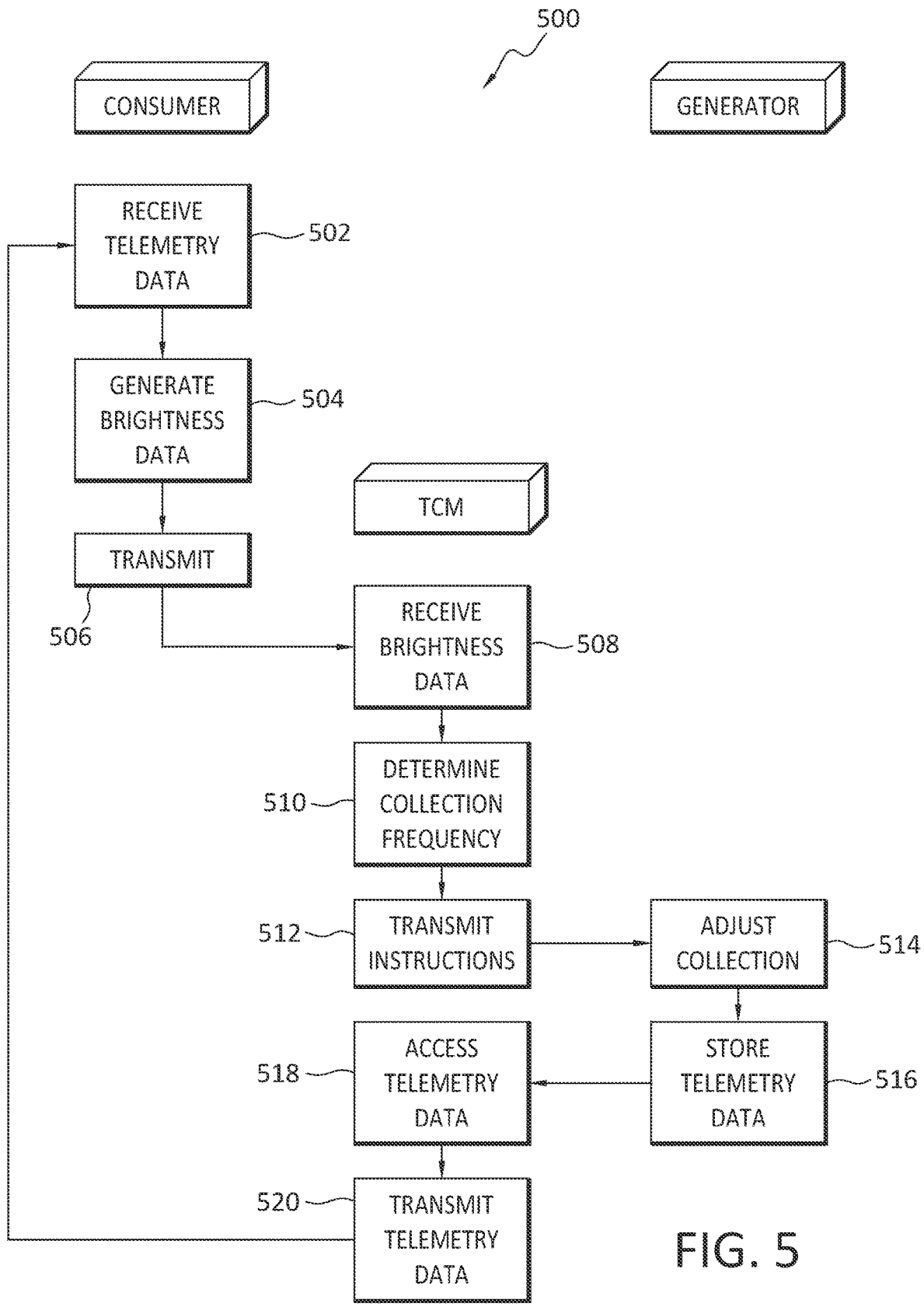
FIG. 5 discloses aspects of an example method for using object brightness as feedback to control telemetry collection.

It is noted with respect to the example method of FIG. 5 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 5, an example method 500 is disclosed according to some embodiments. As indicated, the method 500 may be cooperatively performed by various entities, including a telemetry consumer, a TCM, and a telemetry generator. The functional allocation disclosed in FIG. 5 is presented by way of example and is not intended to limit the scope of the invention in any way.

At 502, a telemetry consumer may receive telemetry information concerning an object that the telemetry consumer has accessed, or may access. From time to time, the telemetry consumer may generate brightness information 504 indicating the extent to which the telemetry consumer uses a particular object, or objects. If, for example, the object is frequently used by the telemetry customer, the brightness value may be relatively high, while if the object is used only infrequently, the brightness value for the object may be relatively low. The brightness information may be generated/updated on a frequency, and timing, determined by the telemetry consumer. The new or modified brightness information may then be transmitted, as feedback 506, by the telemetry consumer to a TCM.

The TCM may receive 508 the brightness information from the telemetry consumer. Based on the brightness information, the TCM may determine a collection frequency 510. The collection frequency may, or may not, be adjusted by the TCM based on the received 508 brightness information. After determination of the collection frequency 510, the TCM may transmit 512 corresponding instructions to the telemetry generator. The telemetry generator may then receive the instructions from the TCM and, based on the instructions, make any necessary adjustments 514 to telemetry collection. Telemetry collected according to the instructions may then be stored 516 in a datastore.

After the telemetry data has been stored 516, the TCM may access the telemetry data 518, and transmit the telemetry data 520 to the telemetry consumer. The telemetry data is received 502 by the telemetry consumer.

As indicated in FIG. 5, the method 500 may be performed on an ongoing basis. This may be desirable as changes may occur that will affect some, or all, aspects of the method 500. Such changes may include, for example, addition and/or removal of one or more telemetry generators and/or telemetry consumers, changes to the frequency with which a data object is accessed, the addition/deletion/modification of data objects, and changes to the telemetry needs of a telemetry consumer.

E. Further Example Embodiments

Following are some further example embodiments of the invention. These are presented only by way of example and are not intended to limit the scope of the invention in any way.

Embodiment 1. A method, comprising: receiving, by a telemetry collection manager from a telemetry consumer, brightness information concerning data accessed by the telemetry consumer; using, by the telemetry collection manager, the brightness information to determine a collection frequency for telemetry concerning the data; and transmitting, by the telemetry collection manager, telemetry collection frequency information to a telemetry generator.

Embodiment 2. The method as recited in embodiment 1, wherein the brightness information is generated by the telemetry consumer.

Embodiment 3. The method as recited in any of embodiments 1-2, wherein the telemetry generator comprises an application and/or hardware.

Embodiment 4. The method as recited in any of embodiments 1-3, further comprising transmitting, by the telemetry collection manager to the telemetry consumer, telemetry generated by the telemetry generator.

Embodiment 5. The method as recited in any of embodiments 1-4, wherein the brightness information is a function of a frequency with which the data is accessed by the telemetry consumer.

Embodiment 6. The method as recited in any of embodiments 1-5, wherein the telemetry collection manager transmits telemetry to the telemetry consumer by way of a telemetry collector.

Embodiment 7. The method as recited in any of embodiments 1-6, wherein the telemetry collection manager assigns a maximum brightness to the data, and the maximum brightness is determined based on accessing of the data by one or more additional telemetry consumers.

Embodiment 8. The method as recited in embodiment 7, wherein the maximum brightness is a maximum brightness assigned by and of the telemetry consumers.

Embodiment 9. The method as recited in any of embodiments 1-8, wherein the brightness increases with an increase in a frequency with which the data is accessed.

Embodiment 10. The method as recited in any of embodiments 1-9, wherein a timing of the transmission of the telemetry transmitted by the telemetry generator to the telemetry consumer is a function of the collection frequency.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
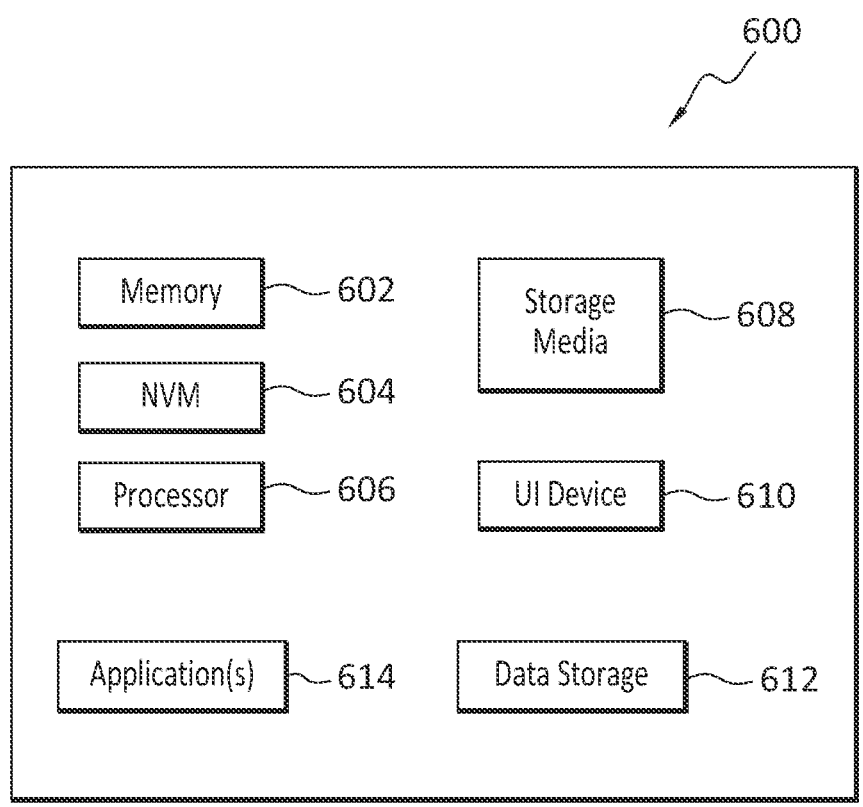
FIG. 6 discloses an example computing entity operable to perform any of the disclosed methods, processes, and operations.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 612 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
saving, by a telemetry collection manager, telemetry data objects, which are generated by a telemetry generator, in a datastore;
receiving, as feedback from each telemetry consumer of a plurality of telemetry consumers, by the telemetry collection manager, brightness values comprising a brightness value defined in brightness information for each respective telemetry data object of the telemetry data objects, where said each telemetry consumer determines the brightness value based on a number of usages of said each respective telemetry data object from the datastore by said each telemetry consumer per a unit time;
using, by the telemetry collection manager, a maximum of the brightness values from the plurality of telemetry consumers to determine a collection frequency for said each respective telemetry data object;
transmitting, by the telemetry collection manager, the collection frequency for said each respective telemetry object to the telemetry generator, which generates said each respective telemetry object;
adjusting, by the telemetry generator, a frequency of generation of said each respective telemetry object according to the collection frequency for said each respective telemetry object;
transmitting, by the telemetry collection manager to said each telemetry consumer, said each respective telemetry object generated by the telemetry generator.

2. The method as recited in claim 1, wherein the brightness value is generated by said each telemetry consumer.

3. The method as recited in claim 1, wherein the telemetry generator comprises an application and/or hardware.

4. The method as recited in claim 1, wherein the telemetry collection manager causes the transmitting of said each respective telemetry object to said each telemetry consumer by way of a telemetry collector.

5. The method as recited in claim 1, wherein the telemetry collection manager assigns the maximum brightness value for each respective telemetry data object.

6. The method as recited in claim 5, wherein the maximum brightness value is assigned by the plurality of telemetry consumers.

7. The method as recited in claim 1, wherein the brightness value defined in the brightness information increases with an increase in a frequency with which the respective telemetry data object is accessed.

8. The method as recited in claim 1, wherein a timing of the transmitting of said each respective telemetry object by the telemetry generator to said each telemetry consumer is a function of the collection frequency.

9. A non-transitory storage medium having stored therein instructions that are executable by one or more hardware processors to perform operations comprising:
   saving, by a telemetry collection manager, telemetry data objects, which are generated by a telemetry generator, in a datastore;
   receiving, as feedback from each telemetry consumer of a plurality of telemetry consumers, by the telemetry collection manager, brightness values comprising a brightness value defined in brightness information for each respective telemetry data object of the telemetry data objects, where said each telemetry consumer determines the brightness value based on a number of usages of said each respective telemetry data object from the datastore by said each telemetry consumer per a unit time;
   using, by the telemetry collection manager, a maximum of the brightness values from the plurality of telemetry consumers to determine a collection frequency for said each respective telemetry data object;
   transmitting, by the telemetry collection manager, the collection frequency for said each respective telemetry object to the telemetry generator, which generates said each respective telemetry object;
   adjusting, by the telemetry generator, a frequency of generation of said each respective telemetry object according to the collection frequency for said each respective telemetry object;
   transmitting, by the telemetry collection manager to said each telemetry consumer, said each respective telemetry object generated by the telemetry generator.

10. The non-transitory storage medium as recited in claim 9, wherein the brightness value is generated by said each telemetry consumer.

11. The non-transitory storage medium as recited in claim 9, wherein the telemetry generator comprises an application and/or hardware.

12. The non-transitory storage medium as recited in claim 9, wherein the telemetry collection manager causes the transmitting of said each respective telemetry object to said each telemetry consumer by way of a telemetry collector.

13. The non-transitory storage medium as recited in claim 9, wherein the telemetry collection manager assigns the maximum brightness value for each respective telemetry data object.

14. The non-transitory storage medium as recited in claim 13, wherein the maximum brightness value is assigned by the plurality of telemetry consumers.

15. The non-transitory storage medium as recited in claim 9, wherein brightness value defined in the brightness information increases with an increase in a frequency with which the respective telemetry data object is accessed.

16. The non-transitory storage medium as recited in claim 9, wherein a timing of the transmitting of said each respective telemetry object by the telemetry generator to said each telemetry consumer is a function of the collection frequency.

* * * * *